UNITED STATES PATENT OFFICE.

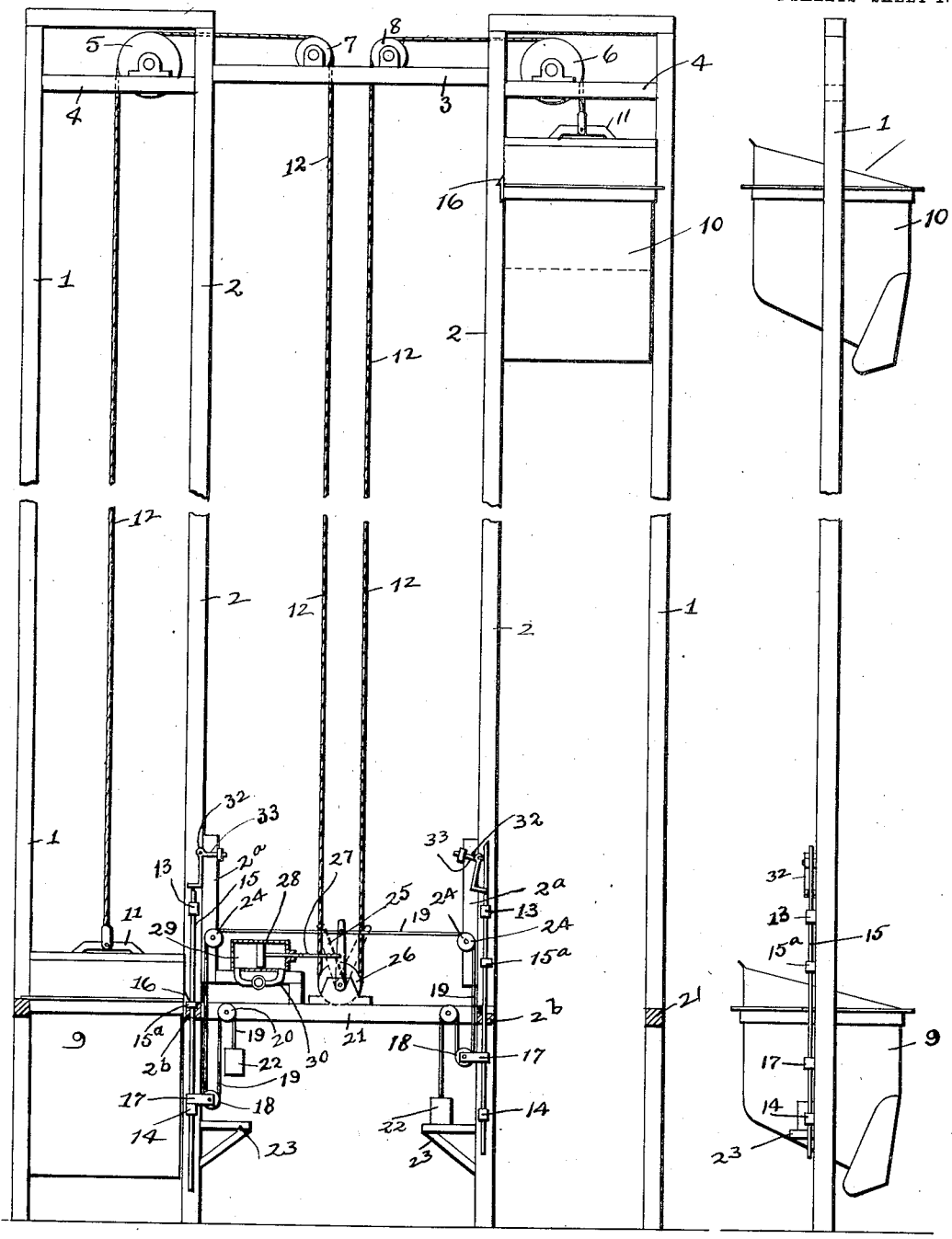

AXEL R. HOLMÉN, OF COLUMBUS, OHIO.

LOADING AND UNLOADING APPARATUS.

954,572.  Specification of Letters Patent.  Patented Apr. 12, 1910.

Application filed April 26, 1909. Serial No. 492,337.

*To all whom it may concern:*

Be it known that I, AXEL R. HOLMÉN, a citizen of Sweden, residing at Columbus, in the county of Franklin and State of Ohio, have invented certain new and useful Improvements in Loading and Unloading Apparatus, of which the following is a specification.

My invention relates to loading and unloading apparatus of that class which is ordinarily employed for elevating and discharging coal and other material into elevated bins or receptacles and in which means are provided for the elevation of one bucket while a second bucket is descending, and has particular relation to the improvement of the construction illustrated and described in my former patents numbered 763,182, 854,890 and 865,041, dated respectively June 21, 1904, May 28th, 1907 and September 13th, 1907.

Figure 3:
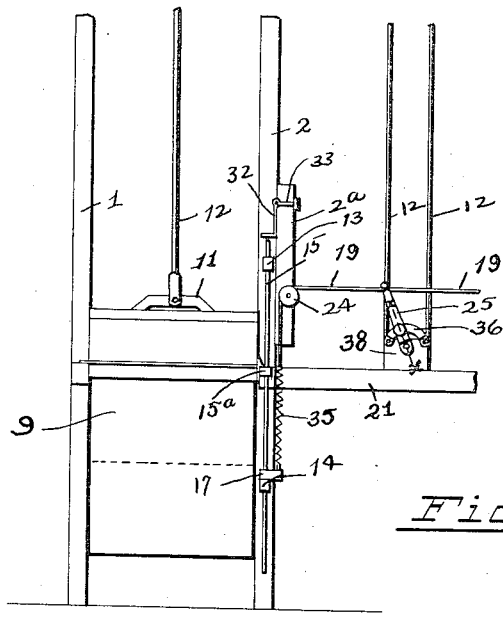
Figure 4:
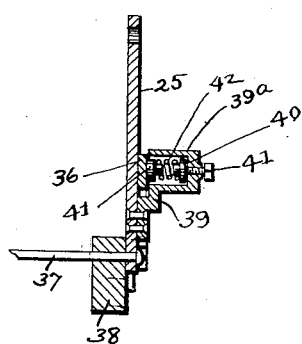
Figure 5:
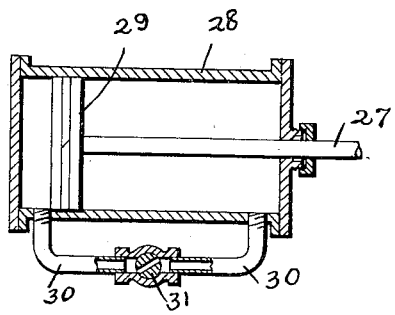
Figure 6:
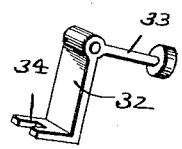

The objects of my present invention are to provide in conjunction with a mechanism of the class specified, improved means and attachments whereby the operation of the motor or engine is automatically stopped and reversed when one of the elevating buckets has reached its lowest position and is loaded ready for ascension; to so construct and arrange the reversing mechanism as to consume sufficient time in the operation of producing said reversal as to permit the loading and unloading of the lowered and raised buckets before the ascension and descent of said buckets, and to produce other improvements the details of which will be more fully pointed out hereinafter. These objects I accomplish in the manner illustrated in the accompanying drawings, in which:

Figure 1 is a view in elevation of my improved loading mechanism, showing one of the buckets in its lowered position and the other in its elevated position, Fig. 2 is a side elevation of the construction shown in Fig. 1, Fig. 3 is a front elevation of a modified motor controlling means, Fig. 4 is an enlarged vertical section of the frictional controlling device shown in Fig. 3, Fig. 5 is an enlarged detail view in section of the motor operating cylinder shown in Fig. 1, and, Fig. 6 is a detail view in perspective of a trip or latch which I employ in the manner hereinafter described.

Similar numerals refer to similar parts throughout the several views.

In the class of loading and unloading devices to which my invention pertains, two vertical elevator frames are provided of proper height and of suitable construction, each of these elevator frames comprising suitably connected standards of which 1 and 2 represent the parallel vertical side frame standards of each frame. In their upper portions the standards 2 are connected by a suitable horizontal frame member 3 and the upper portions of the standards 1 and 2 of each pair are connected by horizontal frame members 4. Journaled in suitable bearing brackets carried by the frame members 4 in the upper portions of the elevator frames, are pulley wheels 5 and 6 and upon the frame member 3 between the elevator frames, are journaled pulley wheels 7 and 8.

Slidably mounted between the side standards 1 and 2 of each of the elevator frames, is a suitable form of conveyer bucket or carrier, these buckets being indicated at 9 and 10 respectively. These buckets are of any suitable or well known construction which will permit of the loading of the same when in a lowered position and a discharge of the loads carried thereby, when in an elevated position. Each bucket is provided in its upper portion with a bail or other suitable projection 11 with which are connected the ends of a hoisting cable 12, the cable running from one of said bucket bails upward over the pulley 5, thence over the pulley 7 and vertically downward therefrom passing about the usual drum or cable carrying wheel of a motor or engine shaft, which are not herein shown. From the cable operating drum, the rope again passes upward and over the pulley 8, thence over the pulley 6 to the bail 11 of the remaining bucket 10. It will be observed that the cable 12 is of such length that when one of the buckets is in its elevated or unloading position, the remaining bucket is in the lowered or loading position.

Upon the outer side of each of the frame standards 2 and in the lower portion thereof, I provide outwardly projecting stationary keepers or eye-lugs 13 and 14. Through the openings of these lugs passes loosely a vertical trip rod 15, which rod carries intermediate its end portions a catch projection 15$^a$. These catch projections 15$^a$ of the rods 15, project in the paths of catch hooks 16, which, as shown on the drawing, project from the inner sides of the buckets 9 and 10. The lower portion of each of the rods 15 has connected therewith and projecting laterally therefrom an arm 17, in the outer end of which is journaled or pivoted a pulley wheel 18. Running about each of these pulleys 18, is a cable 19 from the outer side of which said cable runs upward over a small pulley 20 mounted on a transverse frame member 21 which extends between the frame standards 2 beneath which pulley said cable carries a weight 22, the latter when in its lowest position being adapted to bear upon a bracket 23 which projects from the inner side of the adjacent standard 2. From the inner side of the pulley 18 the cable 19 runs upward above the frame member 21 and over a pulley 24 which is mounted on a frame piece 2$^a$ which is attached to the inner side of the frame standard 2. From these pulleys 24, the cables 19 extend toward each other and connect with the upper end portion of a lever 25, the lower end of which lever is connected with a suitably journaled motor operating member 26. With the lever 25 is pivotally connected one end of a piston rod 27, which piston rod extends into a cylinder 28 and carries therein a piston 29. The cylinder 28 is formed near each end with a port, said ports being connected by a by-pass or pipe 30 which is intersected by a valve 31 (see Fig. 5). For the reason hereinafter set forth the cylinder 28 is designed to contain a suitable quantity of oil or other fluid.

Pivoted to the outer side of each of the standards 2, is the upper end of a depending bell crank trip 32, said upper pivoted end having a laterally extending weighted arm 33, which insures the retention of the trip body in a vertical position. The lower inturned end of the trip is as indicated at 34, recessed or bifurcated and when the corresponding rod 15 in its lowered position, that is, with its arm 17 upon the keeper 14 and its projection 15$^a$ seated in a cross frame member 2$^b$, the upper end of said rod which is beveled, as shown, is below and in contact with the underside of the inturned lower end of the trip 32 in rear of its bifurcation 34, said trip thus preventing the upward movement of the rod until the trip is displaced in the manner hereinafter described.

In order to describe the operation of my device, I will assume that the parts are in the positions indicated in Fig. 1 of the drawing, in which the bucket 9 at the left is in its lowered position, the weight 22 being elevated, as shown, from the bracket 23, the piston 29 being in the center of the cylinder 28 and the lever 25 in a vertical position. When the lever 25 is in the vertical position shown, power is cut off from the motor and the lowered buckets 9 and 10 are in positions respectively for loading and unloading. It will be understood, however, that the downward pull exerted on the cable 19 by the weight 22, will result in a gradual movement of the lever 25 toward the position indicated in dotted lines at the left, but owing to the fact that the piston 29 is being forced against a volume of fluid in the cylinder 29, such resistance is offered to said piston as to insure a retarded or comparatively slow movement of the lever 25, with the result that the motor has imparted thereto an initial slow operation, which gradually increases as the lever is moved to the left, until sufficient power is generated to raise the loaded bucket 9, the initial movement of said bucket being also slow. Thus time is provided for the loading of the lowered bucket and for the unloading of the elevated bucket. As the bucket 9 travels upward, its hook projection 16 comes into contact with the inner end of the bifurcation of the trip 32, which is shown at the left in Fig. 1 of the drawing, resulting in pressing or swinging said trip outward to the position of the trip shown at the right in said figure. By this operation, the contact of the upper end of the left-hand rod 15 with the underside of the trip, is broken and the rod, through the downward movement of the corresponding weight 22, is permitted to move upward in its guides 13 and 14, by reason of the downward pull of the weight 22 until said weight is seated upon the bracket 23. As the bucket 9 moves upward in its frame, the bucket 10 is moving at a corresponding speed downward and when the latter descends until its hook projection 16 engages the projection 15$^a$ on the rod 15 at the right in Fig. 1, it is obvious that said rod will be forced downward through its guides 13 and that this downward movement will result in a corresponding downward movement of the pulley 18 and cable and an upward movement of the corresponding weight 22. The downward movement of the rod 15 thus imparted, continues until the corresponding trip 32 swings to its normal position and latches the rod against upward movement. Owing to the downward pull produced by the upward movement of the right-hand weight, on that portion of the cable 19 which is adjacent to the right-hand elevator frame in Fig. 1, it is obvious that the lever 25 will be pulled by said cable, in the direction of said right-hand elevator frame. Owing to the fact, however, that the fluid contained in the cylinder 28 in rear of the piston 29, will afford resistance to the inward movement of said piston, it will be understood that the return of the motor controlling lever 25 to the position shown in full lines and the movement of said lever to the position indicated in dotted lines at the right, will be a comparatively slow operation, thus again providing time for the loading and unloading of the buckets 10 and 9. It is obvious that the speed at which the piston travels, may be regulated by turning the valve 31, so as to form a more or less direct connection between the sections of the pipe 30. By the means described, it will be understood that the operation of alternately raising and lowering the buckets and retaining the same in their raised or lowered positions a sufficient time to permit of the unloading and loading of the same, will be continued automatically.

In Figs. 3 and 4 of the drawing, I have illustrated a modified construction, which obviates the necessity of using the resistance cylinder and the weights at the ends of the cable 19. In this modified construction, the ends of said cable are connected with the rod arms 14 and 17 through the medium of springs, one of which is shown at 35, while the movement of the motor controlling lever 25, is retarded by frictional contact with a fixed segment or curved bar 36 beneath which said lever is connected with a motor operating rod 37 which is pivoted in a block 38 rising from the frame 21. In producing this frictional contact, I secure to the lever 25, below the segment 36 the lower end of a bracket or housing body 39, the upper portion of which extends outward in the form of a cylindrical housing 39$^a$. Between two followers 40 and 41, arranged one in the outer end of said housing and the other in the inner end thereof and against the segment 36, is interposed a coiled spring 42, the tension of which may be increased as described by the turning against the outer follower 40, of a set screw or bolt 41$^a$ which passes through a threaded opening in the housing 39$^a$. The pressure of the spring 42, as will be readily understood, is sufficient to exert a desirable degree of friction between the lever and segment 36 to insure a comparatively slow movement of said lever, for the reason hereinbefore stated.

What I claim, is:

1. In an automatic hoisting apparatus, the combination with a pair of buckets, of a flexible cable connected to said buckets and a hoisting drum over which said cable passes, a controlling member for said hoisting drum, means for retarding the movement of said controlling member in both directions, and means for actuating said controlling member in both directions, said last named means comprising weighted cables connected to said controlling member and means for elevating the weights of said cables upon the descent of the corresponding bucket.

2. The combination with a pair of elevator frames, a bucket movable in each frame, and a vertically movable rod on each frame adapted to engage the corresponding bucket, of a device for controlling the direction of movements of said buckets, flexible connections between said controlling device and rods, and means connected with said controlling device for retarding the movement of the latter.

3. The combination with a pair of elevator frames, a movable bucket in each frame, a vertically movable rod on each frame which by engagement with a descending bucket is moved to a locked position, and means for releasing said rod on the upward movement of the bucket, of means for simultaneously elevating one of said buckets and lowering the other, a lever controlling said elevating means, and connections between said rods and lever for slowly moving said lever to reverse the movement of said elevating means.

In testimony whereof I affix my signature in presence of two witnesses.

AXEL R. HOLMÉN.

Witnesses:
L. CARL STOUGHTON,
A. L. PHELPS.